United States Patent
Bauer et al.

(10) Patent No.: US 10,800,389 B2
(45) Date of Patent: Oct. 13, 2020

(54) HAPTIC FEEDBACK FOR DECOUPLED BRAKE SYSTEM

(71) Applicant: Robert Bosch GmbH, Stuttgart (DE)

(72) Inventors: Urs Bauer, Sachsenheim (DE); Ryan A. Kuhlman, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 172 days.

(21) Appl. No.: 16/118,936

(22) Filed: Aug. 31, 2018

(65) Prior Publication Data

US 2020/0070792 A1     Mar. 5, 2020

(51) Int. Cl.
*B60T 8/40*   (2006.01)
*B60T 8/176*  (2006.01)
*B60T 8/32*   (2006.01)

(52) U.S. Cl.
CPC .............. *B60T 8/409* (2013.01); *B60T 8/176* (2013.01); *B60T 8/326* (2013.01); *B60T 2270/10* (2013.01); *B60T 2270/82* (2013.01)

(58) Field of Classification Search
CPC ...... B60T 8/409; B60T 8/326; B60T 2270/10; B60T 2270/82; B60T 8/176; B60T 8/4081; B60T 7/042; B60T 13/662; B60T 13/686; B60T 13/745
USPC ........ 303/119.1, 15, 155; 701/70, 71, 78, 83
See application file for complete search history.

(56) References Cited

U.S. PATENT DOCUMENTS

| | | | |
|---|---|---|---|
| 6,135,575 A | 10/2000 | Feigel et al. | |
| 6,213,572 B1 | 4/2001 | Linkner, Jr. et al. | |
| 6,345,871 B1 | 2/2002 | Harris et al. | |
| 7,922,265 B1 | 4/2011 | Cottrell | |
| 8,303,048 B2 | 11/2012 | Anderson et al. | |
| 8,371,661 B2 | 2/2013 | Leiber et al. | |
| 8,944,526 B2 | 2/2015 | Nishioka et al. | |
| 9,174,617 B2 | 11/2015 | Feigel | |
| 9,315,180 B2* | 4/2016 | Jungbecker | B60T 8/4081 |
| 9,415,758 B2* | 8/2016 | Drumm | B60T 17/22 |
| 2002/0084693 A1* | 7/2002 | Isono | B60T 8/4018 303/113.1 |
| 2013/0218407 A1* | 8/2013 | Jungbecker | B60T 7/042 701/34.4 |
| 2015/0035353 A1* | 2/2015 | Drumm | B60T 11/103 303/15 |
| 2015/0197229 A1 | 7/2015 | Knechtges et al. | |

(Continued)

FOREIGN PATENT DOCUMENTS

DE    10213904 A1    10/2003
EP    3342655 A1     7/2018

(Continued)

*Primary Examiner* — Pamela Rodriguez
(74) *Attorney, Agent, or Firm* — Michael Best & Friedrich LLP (57) ABSTRACT

A vehicle braking system includes a brake pedal, a master cylinder, a braking circuit with a wheel cylinder, a brake pressure generator for brake-by-wire braking, and a pedal feel simulator. In response to detecting impending wheel lock-up, a controller conducts an anti-lock braking routine during which the controller is programmed to create an artificial haptic feedback pulse to the brake pedal by opening a normally-open isolation valve between the master cylinder and the brake circuit to move a master cylinder piston until a compensation port opens.

10 Claims, 6 Drawing Sheets

(56) References Cited

U.S. PATENT DOCUMENTS

2016/0152219 A1* 6/2016 Besier .................... B60T 7/042
                                                        303/15
2016/0221553 A1   8/2016 Watanabe
2018/0178773 A1* 6/2018 Foitzik ................ B60T 13/662

FOREIGN PATENT DOCUMENTS

| JP | 2010089599 A  | 4/2010 |
| WO | 2011029812 A1 | 3/2011 |
| WO | 2016015939 A1 | 2/2016 |

\* cited by examiner

HAPTIC FEEDBACK FOR DECOUPLED BRAKE SYSTEM

BACKGROUND

The present invention relates to vehicle brake systems. It is known to provide a vehicle with a full-power brake system (also referred to as a "decoupled" or "brake-by-wire" system) in which driver applied force does not propagate to produce the actual braking force to the brake devices. Instead, fluid is pushed from the master cylinder into a simulator circuit while another mechanism provides the actual braking force. Such systems provide satisfactory braking performance, including anti-lock braking function ("ABS"), and the system isolates the driver's brake pedal from pulsations at the wheel cylinders.

SUMMARY

In one aspect, the invention provides a vehicle braking system including a brake pedal and a master cylinder having an input side configured to receive an input from the brake pedal. The master cylinder has a first output responsive to a first piston and second output responsive to a second piston. The master cylinder is in selective communication with a fluid reservoir via first and second compensation ports. A simulator circuit includes a pedal feel simulator coupled to the first master cylinder output and configured to be actuated by opening a switchable simulator valve, the pedal feel simulator providing a reaction force to the brake pedal when the switchable simulator valve is in an open position. First and second braking circuits each have at least one wheel cylinder and being operable for brake-by-wire operation by a brake pressure generator separate from the brake pedal. A first normally-open isolation valve is operable to close and isolate the first braking circuit from the first master cylinder output and the simulator circuit. A second normally-open isolation valve is operable to close and isolate the second braking circuit from the second master cylinder output. A controller is programmed to activate the brake pressure generator to generate brake fluid pressure in the first and second braking circuits in correlation to the input from the brake pedal. The controller is further programmed to close the first and second normally-open isolation valves during activation of the brake pressure generator so that the master cylinder is coupled to the simulator circuit and neither of the first and second braking circuits to carry out brake-by-wire braking. In response to detecting impending wheel lock-up, the controller is programmed to conduct an anti-lock braking routine during which the controller is programmed to create an artificial haptic feedback pulse to the brake pedal by opening the second normally-open isolation valve to move the second master cylinder piston until the second compensation port opens.

In another aspect, the invention provides a method of operating a vehicle braking system in a decoupled brake-by-wire mode. An isolation valve between a master cylinder and a braking circuit is closed, and a simulator valve is opened to enable a pedal feel simulator. A control signal is provided from a controller to drive a brake pressure generator of a braking circuit, responsive to a braking request detected at a brake pedal, in order to provide a braking pressure at a wheel cylinder of the braking circuit. Impending wheel lock-up is detected with the controller and in response, an anti-lock braking routine begins during which the controller is programmed to create an artificial haptic feedback pulse to the brake pedal by opening the isolation valve to cause a master cylinder piston to retract until a compensation port is opened, connecting a master cylinder chamber with a fluid reservoir.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
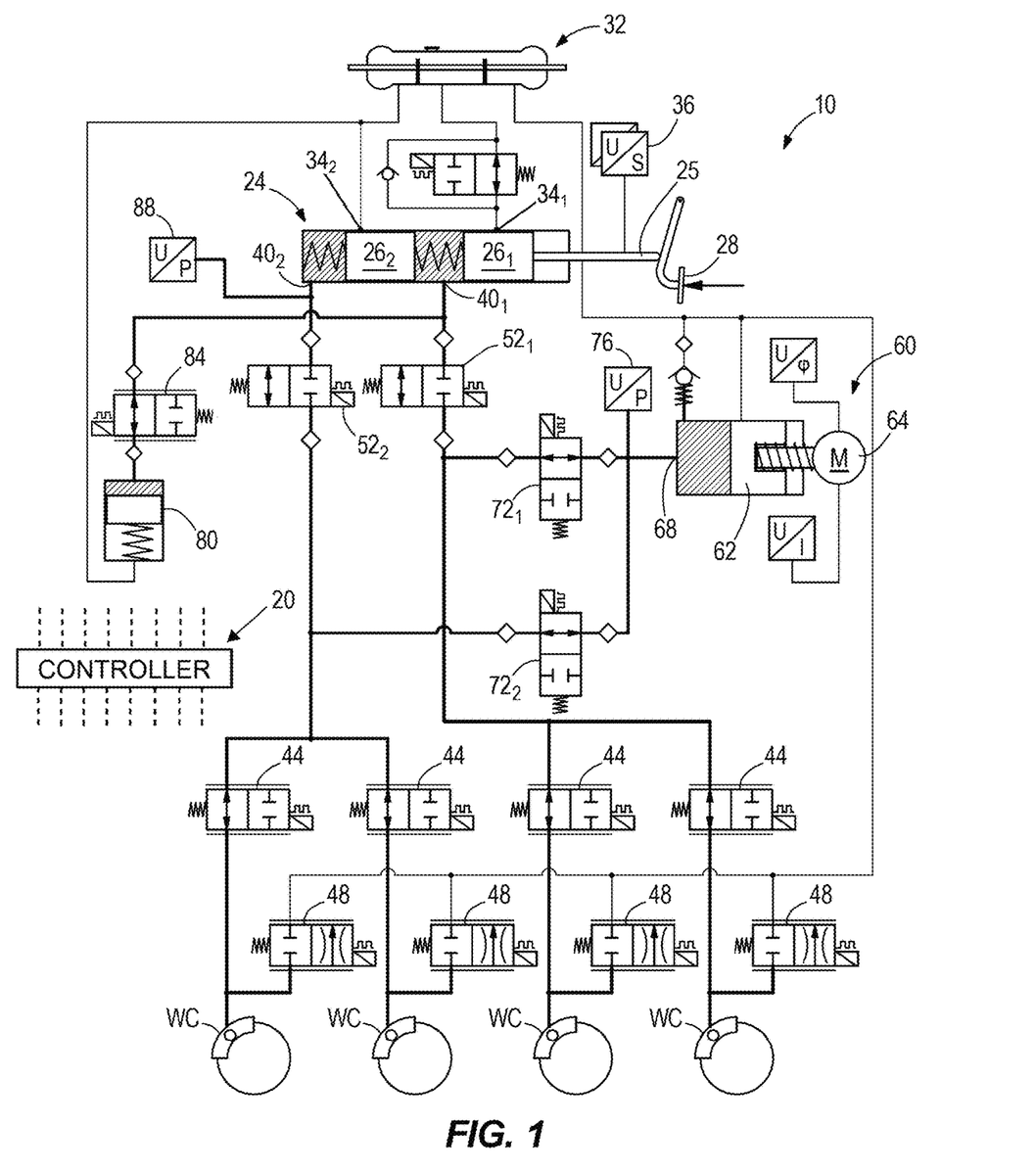
FIG. 1 is a schematic drawing of a vehicle braking system of a decoupled type for brake-by-wire braking according to one aspect of the present invention.

The braking system 10 of FIG. 1 includes a master cylinder 24 having an input side coupled with an input rod 25 to a brake pedal 28 to pressurize hydraulic fluid therein. As illustrated, there is no booster or other actuator between the brake pedal 28 and the master cylinder 24 for modifying the actuation relationship (force vs. stroke) therebetween. The master cylinder 24 includes a first piston $26_1$ that is coupled to the brake pedal 28 to move directly therewith. The first piston $26_1$ pressurizes hydraulic fluid in a first chamber of the master cylinder 24 to be output from the first chamber at a first outlet $40_k$. A second piston $26_2$ of the master cylinder 24 can be moved under the influence of fluid pressurized in the first chamber by the first piston $26_1$, without the second piston $26_2$ having any direct connection to the first piston $26_1$ or the brake pedal 28. The second piston $26_1$ pressurizes hydraulic fluid in a second chamber of the master cylinder 24 to be output from the second chamber at a second outlet $40_2$. The master cylinder pistons $26_1$, $26_2$ are not operable by any separate actuator (e.g., electronically-controlled actuator). A fluid reservoir 32 is in fluid communication with the first and second chambers of the master cylinder 24, via respective compensation ports $34_1$, $34_2$, until the brake pedal 28 is initially actuated, at which time the pistons $26_1$, $26_2$ block off the compensation ports $34_1$, $34_2$. A pedal travel sensor 36 is coupled to the brake pedal 28 and is operable to detect an amount of travel of the brake pedal 28, so that a corresponding signal can be sent to a controller 20. The controller 20 can be a computer electrically coupled with each sensor and each electrically-operable valve of the braking system 10, to send signals thereto and/or receive signals therefrom to establish communication and control necessary to operate the braking system 10.

The dual outputs $40_1$, $40_2$ of the master cylinder 24 are selectively in fluid communication with a first braking circuit and a second braking circuit, respectively. In the illustrated construction, each of the braking circuits includes a pair of brake devices or wheel cylinders WC operable to slow down the wheels of a vehicle on which the braking system 10 is provided. The wheel cylinders WC of a particular circuit can be associated with a set of front vehicle wheels, a set of rear vehicle wheels, or a set of diagonal vehicle wheels. Each braking circuit includes an inlet valve 44 and an outlet valve 48 associated with each respective wheel cylinder WC. The inlet valves 44 are normally-open and can be electrically closed by the controller 20 to stop or limit pressurized hydraulic fluid supplied to the wheel cylinder WC. The outlet valves 48 are normally-closed and can be electrically opened by the controller 20 to relieve pressurized hydraulic fluid at the wheel cylinder WC, to the reservoir 32. Each of the master cylinder outlets $40_k$, $40_2$ is coupled to one of the braking circuits through a normally-open isolation valve $52_k$, $52_2$. Each of the isolation valves $52_k$, $52_2$ is operable to be closed by the controller 20 to fluidly separate or isolate the master cylinder 24, and thus the brake pedal 28, from the braking circuits having the wheel cylinders WC.

Although the master cylinder 24 is capable of providing mechanical braking from the brake pedal 28 to the wheel cylinders WC of the two braking circuits, the system 10 can be provided with an alternate or auxiliary device, separate from the brake pedal 28 and referred to herein as a brake pressure generator 60, for generating hydraulic fluid pressure to the wheel cylinders WC for the requisite braking need. The brake pressure generator 60 can include a plunger or piston 62 drivable in a cylinder by an actuator such as an electric motor 64 operated by the controller 20. As such, the brake pressure generator 60 is operable to drive pressurized hydraulic fluid to the wheel cylinders WC of the first and second braking circuits. For example, an outlet 68 of the brake pressure generator 60 can be coupled, in parallel, to the first and second braking circuits through respective apply pressure control valves $72_k$, $72_2$. Each of the apply pressure control valves $72_k$, $72_2$ can be a controller-modulated solenoid valve (e.g., having a range of open positions, or receiving a pulse-width modulation signal to achieve a similar effect) operable to control the pressure supplied from the brake pressure generator 60 to the wheel cylinders WC of the given braking circuit. The apply pressure control valves $72_k$, $72_2$ can be coupled to respective brake fluid supply lines or passages, each of which extends between one of the isolation valves $52_k$, $52_2$ and the respective inlet valves 44 of the braking circuit. One or more pressure sensors 76 can be positioned along the fluid path between the brake pressure generator outlet 68 and the respective inlet valves 44 and operable to report the fluid pressure to the controller 20. The pressure sensor 76 can be referred to as an "active circuit" pressure sensor as it senses and reports the fluid pressure in the passage(s) coupled to the wheel cylinders WC, as contrasted with fluid pressure in the master cylinder 24 or a simulator circuit, which are not part of an active braking circuit during brake-by-wire operation. Additional sensors may be provided to monitor parameters of the piston 62 and/or the electric motor 64, and may include any one or more of: linear or angular position, electrical current, electrical voltage, force, torque, or temperature.

In addition to the active braking components in the system 10, a simulator circuit is provided in fluid communication with the output side of the master cylinder 24. The simulator circuit is provided upstream of the isolation valves $52_k$, $52_2$, meaning the side nearer the master cylinder and remote from the braking circuits so that the simulator circuit is kept in fluid communication with the master cylinder 24 when the isolation valves $52_k$, $52_2$ are closed. The simulator circuit includes a pedal feel simulator 80 coupled to an outlet of the master cylinder 24 (e.g., the first outlet $40_1$) through a switchable simulator valve 84. The simulator valve 84 can be a normally-closed switchable solenoid valve operable to be opened by the controller 20 to establish fluid communication between the master cylinder outlet $40_1$ and the pedal feel simulator 80. When the simulator valve 84 is open, fluid pushed out of the master cylinder chamber through the outlet $40_1$ is passed into the pedal feel simulator 80, which has a biasing mechanism that provides a feedback force to the brake pedal 28. Thus, the simulator circuit mimics the feel of actuating the wheel cylinders WC when in fact the brake pedal 28 is decoupled by the isolation valves $52_k$, $52_2$ from the actual braking pressure activating the wheel cylinders WC in the braking circuits. As illustrated, the simulator valve 84 is coupled on a "front" side of the pedal feel simulator 80, which has a separator element (e.g., plunger) therein to divide the front side from a "back" side which is coupled to the reservoir 32. In the illustrated construction, the back side of the simulator 80 is directly coupled to the reservoir 32 with no intermediate valves. In some constructions, the simulator valve 84 is located between the back side of the simulator 80 and the reservoir 32. In either position, opening the simulator valve 84 enables or actuates the simulator 80 for operation so that the simulator circuit is made active.

A pressure sensor 88 is provided in fluid communication with the master cylinder 24 to detect a fluid pressure generated in one of the master cylinder chambers. For example, the pressure sensor 88 can be coupled to the second master cylinder outlet $40_2$, upstream of the isolation valve $52_2$. The pressure sensor 88 is operable to generate a braking request signal responsive to an input force from the brake pedal 28.

Though not conducive to labeling in FIG. 1, it will be understood that each braking circuit extends from one of the isolation valves $52_k$, $52_2$ to the respective wheel cylinder(s) WC, and further includes the passages connecting to the brake pressure generator 60, and the respective passages connecting to the fluid reservoir 32, while the simulator circuit is a separate circuit, not part of either of the braking circuits, since fluid in the simulator circuit is not conveyed to contribute to actual braking force at the wheel cylinders WC.

During normal operation of the braking system 10, the brake pedal 28 is decoupled from the wheel cylinders WC so that braking occurs fully in a primary brake-by-wire mode. When the driver depresses the brake pedal 28, the isolation valves $52_k$, $52_2$ are actuated to a closed position (opposite the position shown in FIG. 1) so that the master cylinder 24 and the simulator circuit are cut-off or isolated from the braking circuits. The simulator valve 84 is also switched open by the controller 20 upon initial actuation of the brake pedal 28, which can be detected by the pedal travel sensor 36. A pressure increase occurs in the second master cylinder chamber and between the second outlet $40_2$ and the second isolation valve $52_2$ since the pedal 28 urges the pistons $26_k$, $26_2$ to move toward the closed-off second isolation valve $52_2$. The pressure increase is measured or detected by the primary pressure sensor 88 and conveyed as a signal to the controller 20, which is programmed to use the information to determine the degree of actuation of the brake pressure generator 60 to achieve a target brake force as requested by the driver's actuation of the brake pedal 28. In some constructions, an output of the pedal travel sensor 36 is also considered by the controller 20 along with the primary pressure sensor 88 in quantifying the driver's braking request. The controller 20 can also provide variable manipulation of the apply pressure control valves $72_k$, $72_2$ to achieve a desired brake force and brake force balance in the braking circuits. Thus, in the illustrated construction, the motor 64 is energized as programmed by the controller 20 to drive the piston 62 forward in the cylinder toward the outlet 68 so that fluid pressure is generated at the outlet and hydraulic fluid is moved from the brake pressure generator 60 toward the wheel cylinders WC, which may include one or more pistons incorporated into brake calipers so that the hydraulic fluid from the generator 60 causes the wheel cylinders WC to squeeze onto a brake disc. As can be interpreted from this description, the brake pressure generator 60 is controlled to achieve an amount of braking according to the driver's request, which is interpreted at least in part by the primary pressure sensor 88, which continuously measures how hard the driver is applying pressure to the brake pedal 28. In the event of a component failure or abnormality, the braking system 10 may provide a back-up mode of operation by transitioning to a direct mechanical push-through back-up mode or to a secondary brake-by-wire mode. One exemplary back-up mode may include returning the isolation valves $52_k$, $52_2$ to their normally-open positions to allow the brake pedal 28 to actuate the wheel cylinders WC through the master cylinder 24.

Figure 2:
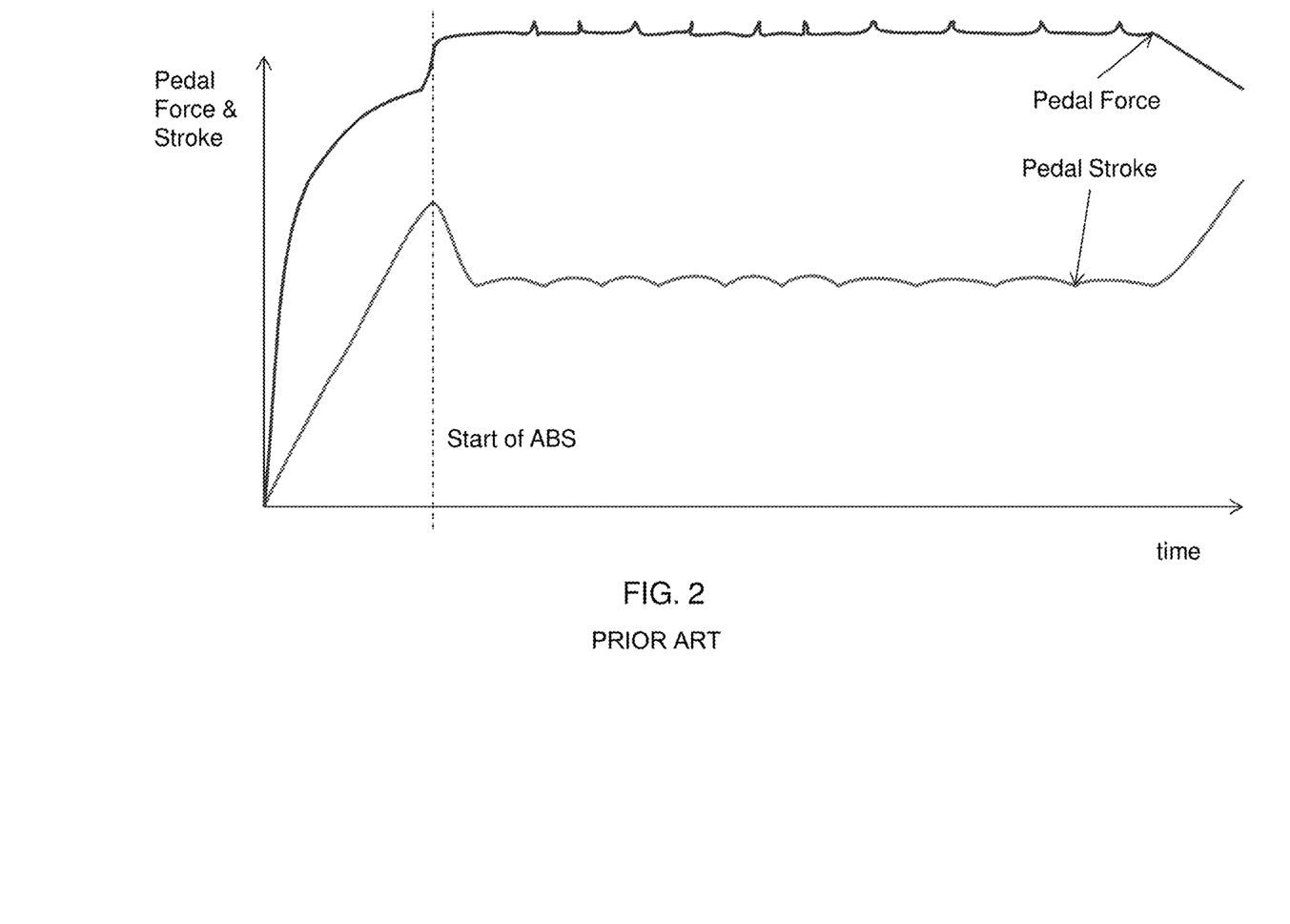
FIG. 2 is a graph of pedal force and pedal stroke for a conventional coupled braking system during a braking event that triggers ABS operation.
Figure 3:
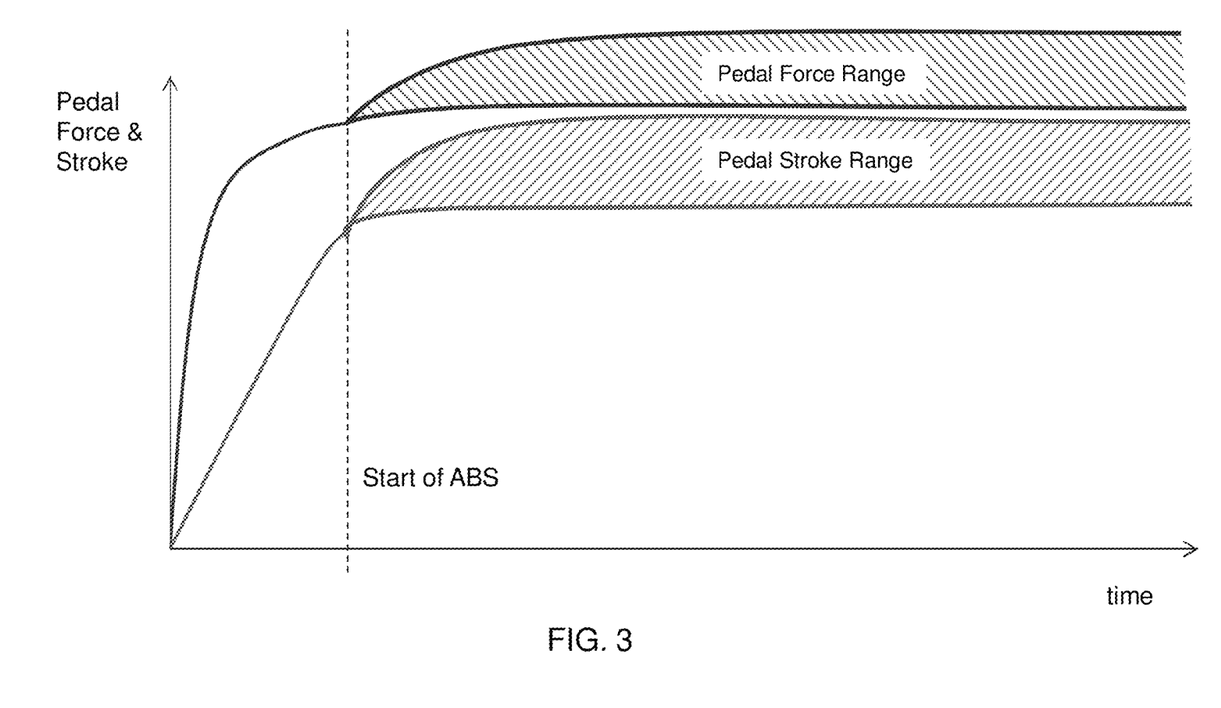
FIG. 3 is a graph of pedal force and pedal stroke for a decoupled braking system like that of FIG. 1 during a brake-by-wire braking event that triggers ABS operation.

Although the hydraulic pressure that sets the braking force at the wheel cylinders WC is electronically controlled in relation to the driver's request, there is the potential for an instance in which the requested braking force at one or more wheel cylinders WC exceeds the available traction between the tire and the road surface, which tends to cause "lock-up" or skidding of the wheel(s) with respect to the road surface. As is well known in the art, such a condition can be identified and vehicle steerability can be maintained by engaging an appropriate anti-lock braking system (ABS), which utilizes the valves 44, 48 to avoid the continued application of excess hydraulic pressure, instead regulating the hydraulic fluid pressure to maintain braking force at or near the traction limit, as long as the driver maintains a request at or above the traction limit. Although ABS is a well-known function in vehicle braking systems and is in fact government mandated for many types of vehicles throughout various parts of the world, the ABS function was originally developed in standard coupled braking systems in which there is a direct hydraulic connection between the wheel cylinders and the master cylinder and in which driver applied force is propagated to produce the actual braking force at the wheel cylinders. For any driver accustomed to operating a vehicle with such a coupled brake systems and engaging the ABS function, there is an expected brake pedal reaction behavior that is highly recognizable such that the driver knows when the ABS has engaged, or has ceased. FIG. 2 illustrates overlaid graphs of pedal force and pedal stroke versus time for an increasing brake application up to and into an ABS event in a conventional coupled brake system. As is shown there, pedal force rises up to the point of ABS engagement and is then maintained at a level value that is interrupted at intervals by small, momentary peaks. Pedal stroke actually decreases somewhat at the start of ABS and then settles toward a steady value, although the pedal will pulse, moving up and down slightly throughout the ABS event. To the contrary, an ABS event in a conventional decoupled braking system like that of FIG. 1 will produce pedal force and stroke behavior as shown in FIG. 3. Generally speaking, the pedal feeling does not change during ABS, and the pedal is free to travel in stroke past the ABS entry point. Even if the driver is not accustomed to the feel of ABS in coupled systems and therefore does not necessarily expect a certain pedal reaction behavior, there is a general lack of haptic communication to the driver through the brake pedal.

The present disclosure relates to one or more routines, implemented by the controller 20 within the system 10, the controller 20 being programmed with stored instructions for executing such routine(s) through communication with the illustrated sensors and control of the illustrated electronically-actuated devices of the system 10, including the motor 64 and all the valves. Each routine relates to the behavior of the system during an ABS event (i.e., when the controller 20 switches into a programmed ABS routine to regulate brake pressure below an amount corresponding to driver request due to the detection of impending wheel lock-up). More particularly, each routine relates to a manner of implementing haptic feedback to the pedal 28 during ABS, while the system 10 maintains brake-by-wire operation in which actual hydraulic brake fluid pressure for braking to the wheel cylinders WC is not generated through the pedal 28.

Figure 4:
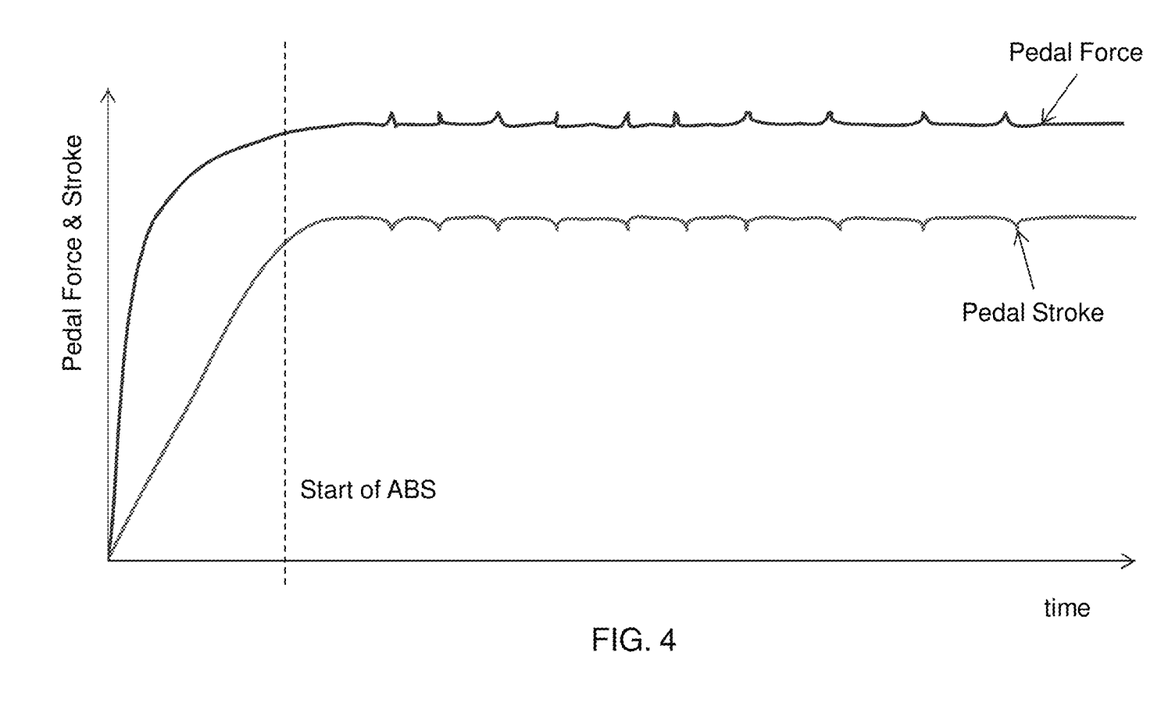
FIG. 4 is a graph of pedal force and pedal stroke for a decoupled braking system like that of FIG. 1 during a brake-by-wire braking event that triggers ABS operation, wherein the controller conducts a first routine to provide a haptic indication of the ABS event at the brake pedal.

In a first routine, the controller 20, upon engaging the ABS function, opens an isolation valve (e.g., the second isolation valve $52_2$). The second isolation valve $52_2$ can be opened to a full or partial open position, or controlled via pulsed opening. Pulsed opening can be achieved by applying a pulse-width modulation signal according to a predetermined duty cycle. In the case of the normally-open isolation valve $52_2$, the duty cycle is less than 100 percent, which corresponds to the fully-closed valve state. Opening the second isolation valve $52_2$ establishes a connection between a chamber of the master cylinder 24 and one of the active braking circuits where fluid pressure from the brake pressure generator 60 is incident. In the illustrated construction, opening the second isolation valve $52_2$ establishes a connection between the active braking circuit and a secondary or remote master cylinder chamber, which is on the downstream side of the second piston $26_2$. As such, the second isolation valve $52_2$ does not establish connection directly with the simulator circuit having the simulator valve 84 and the pedal feel simulator 80. The first isolation valve $52_1$ does not open and remains closed during the ABS function. In opening the second isolation valve $52_2$, a sudden rise or spike of fluid pressure in the master cylinder 24 occurs as is shown graphically in FIG. 4. The pressure spike moves the second master cylinder piston $26_2$ by an amount that at least partially opens the second compensation port $34_2$. Simultaneous with each such pressure spike, and as a result thereof, the pedal stroke is momentarily reduced. Thus, a haptic feedback pulse is generated artificially. Following this action, the second isolation valve $52_2$ is re-closed and the second master cylinder piston $26_2$ returns to its original position covering the second compensation port $34_2$. The pedal force and pedal stroke return to their steady values momentarily until the above described process of generating the haptic feedback pulse is repeated by again opening the second isolation valve $52_2$. As shown, the haptic feedback pulses can be repeatedly generated throughout the active period of the ABS function. The haptic feedback pulses can be set to occur in a predefined pattern by the controller 20. The pattern can be a cyclic pattern with a predefined frequency or period, or an irregular pattern. In some constructions, the frequency of the haptic feedback pulses is selected by the controller 20 from a plurality of programmed frequencies to correlate with a physical parameter or a condition of the ongoing ABS function. For example, the frequency selected by the controller 20 may be a function of the difference between target (driver's requested) brake pressure and actual brake pressure (e.g., increasing frequency with an increasing difference). In another example, the frequency selected by the controller 20 may be a function of the number of vehicle wheels engaged in the ABS operation (e.g., increasing frequency with an increasing number). The haptic feedback pulses as generated in the above described manner can be made and felt by the driver through the pedal 28, irrespective of whether the driver increases the input force to the pedal 28, decreases it, or holds it steady.

Figure 5:
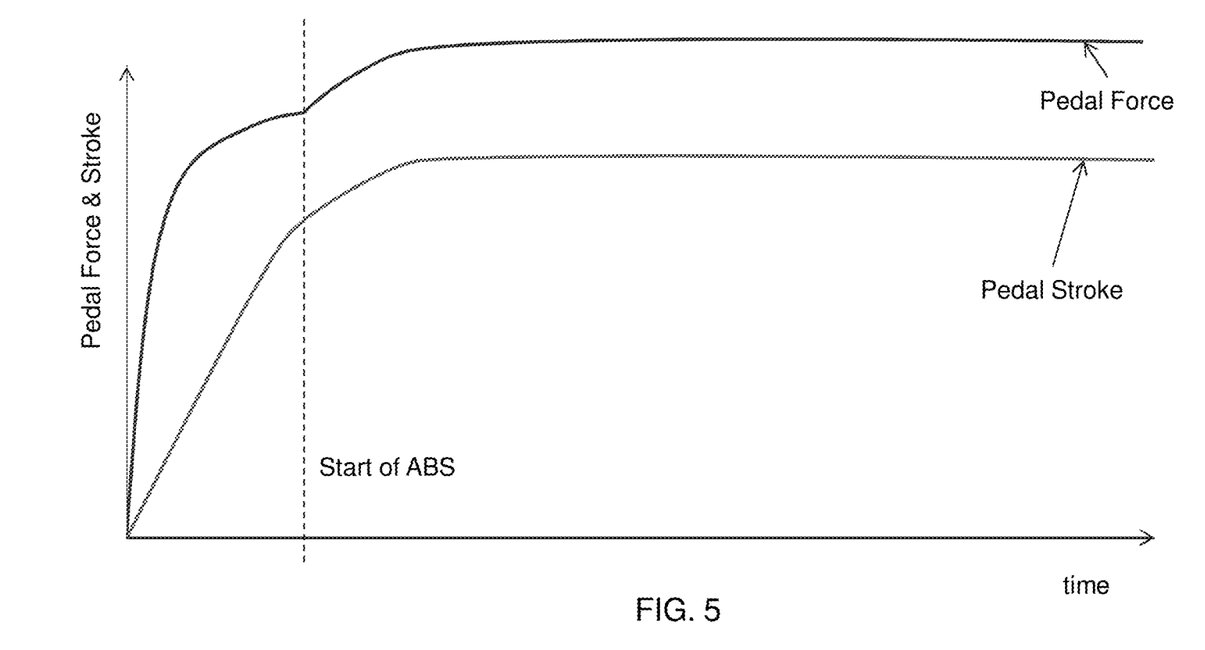
FIG. 5 is a graph of pedal force and pedal stroke for a decoupled braking system like that of FIG. 1 during a brake-by-wire braking event that triggers ABS operation, wherein the controller conducts a second routine to provide a haptic indication of the ABS event at the brake pedal.
Figure 6:
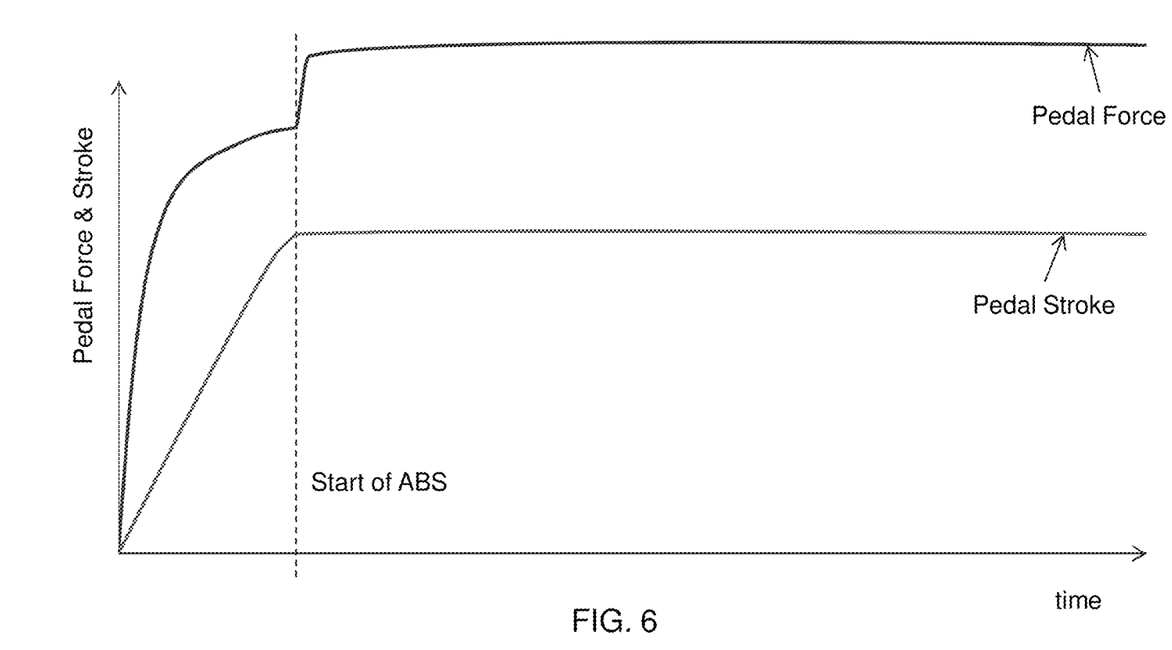
FIG. 6 is a graph of pedal force and pedal stroke for a decoupled braking system like that of FIG. 1 during a brake-by-wire braking event that triggers ABS operation, wherein the controller conducts a third routine to provide a haptic indication of the ABS event at the brake pedal.

In a second proposed routine, the controller 20, upon engaging the ABS function, closes a simulator valve (e.g., the normally-closed simulator valve 84 between the master cylinder 24 and the pedal feel simulator 80 that is open during normal brake-by-wire operation can be partially or fully closed). The simulator valve 84 can be closed to a partial open position, or controlled via pulsed opening. Pulsed opening can be achieved by applying a pulse-width modulation signal according to a predetermined duty cycle. In the case of the normally-closed simulator valve 84, the duty cycle is less than 100 percent, which corresponds to the fully-open valve state. In some cases, the duty cycle is less than 50 percent or less than 30 percent, and in some cases 0 percent to close the main stage of the simulator valve 84. The duty cycle with a particular valve design is related to the pressure differential and flow. Closing the simulator valve 84 in this way establishes a highly throttled connection, for example only through an auxiliary valve stage, between the master cylinder 24 (e.g., first outlet 40₁) and the simulator 80. This causes an abrupt change in the force/travel relationship for the brake pedal 28 toward a heavily damped pedal feel at the ABS entry point, which can be seen in the graph of FIG. 5. In other words, although the pedal force may not fluctuate throughout ABS as in the first routine, the pedal force undergoes a sharp transition at the ABS entry point and is not represented by a smooth curve that traverses the ABS entry point. Rather, there is a corner or cusp in the pedal force at the ABS entry point at which point the pedal force rises at a faster rate as compared to the lead up to ABS. As such, the second routine accomplishes a haptic feedback to alert the driver of ABS activation. Such a routine may also be an effective way to simulate electronic brake force distribution (EBD), the pedal increasing stroke during significant ABS pressure increases, or the pedal stroke increase at the end of ABS.

A third routine is a modification of the second routine which completely closes the simulator valve 84 (i.e., closing both the main and auxiliary valve stages) upon engaging the ABS function. This provides haptic feedback to alert the driver of ABS activation in yet another way—by introducing a hard limit to the brake pedal 28. Just as in the second routine, the pedal force versus time plot includes a corner or cusp at the ABS entry point. However, unlike the second routine, the pedal force almost immediately assumes a higher slope (e.g., approximating a straight line) to the increased final pedal force value. This is similar to the effect seen on FIG. 2 for a conventional coupled brake system. Due to the introduction of the hard limit, pedal stroke abruptly assumes a flat value as of the ABS entry point. As such, the pedal stroke versus time plot also features a corner at the ABS entry point. The only pedal travel available is that of the elasticity in the master cylinder 24.

Various features of the invention are set forth in the following claims.

What is claimed is:

1. A vehicle braking system comprising:
 a brake pedal;
 a master cylinder having an input side configured to receive an input from the brake pedal, a first output responsive to a first piston, and second output responsive to a second piston, wherein the master cylinder is in selective communication with a fluid reservoir via first and second compensation ports;
 first and second braking circuits, each having at least one wheel cylinder and being operable for brake-by-wire operation by a brake pressure generator separate from the brake pedal;
 a simulator circuit including a pedal feel simulator coupled to the first master cylinder output and configured to be actuated by opening a switchable simulator valve, the pedal feel simulator providing a reaction force to the brake pedal when the switchable simulator valve is in an open position;
 a first normally-open isolation valve operable to close and isolate the first braking circuit from the first master cylinder output and the simulator circuit;
 a second normally-open isolation valve operable to close and isolate the second braking circuit from the second master cylinder output; and
 a controller programmed to activate the brake pressure generator to generate brake fluid pressure in the first and second braking circuits in correlation to the input from the brake pedal, the controller further being programmed to close the first and second normally-open isolation valves during activation of the brake pressure generator so that the master cylinder is coupled to the simulator circuit and neither of the first and second braking circuits to carry out brake-by-wire braking;
 wherein, in response to detecting impending wheel lockup, the controller is programmed to conduct an anti-lock braking routine during which the controller is programmed to create an artificial haptic feedback pulse to the brake pedal by opening the second normally-open isolation valve to move the second master cylinder piston until the second compensation port opens,
 wherein the controller is programmed to repeat the artificial haptic feedback pulse throughout the anti-lock braking routine by repeatedly opening and closing the second normally-open isolation valve to move the second master cylinder piston back and forth across the second compensation port,
 wherein the controller is programmed to create the artificial haptic feedback pulse with a frequency selected from a plurality of programmed frequencies to correlate with a condition of the ongoing anti-lock braking routine, and
 wherein the condition on which the artificial haptic feedback pulse frequency is selected is a number of vehicle wheels engaged in brake pressure reduction via the anti-lock braking routine.

2. The vehicle braking system of claim 1, wherein the simulator valve is a normally-closed solenoid valve.

3. The vehicle braking system of claim 1, wherein the first master cylinder piston is positioned adjacent the brake pedal, and the second master cylinder piston is positioned remote from the brake pedal.

4. The vehicle braking system of claim 1, wherein each of the first and second braking circuits further includes an apply pressure control valve in the form of a controller-modulated solenoid valve between an output of the brake pressure generator and the at least one wheel cylinder.

5. The vehicle braking system of claim 1, wherein the brake pressure generator includes a motor-driven piston.

6. A method of operating a vehicle braking system in a decoupled brake-by wire mode, the method comprising:
   closing an isolation valve between a master cylinder and a braking circuit;
   opening a simulator valve to enable a pedal feel simulator;
   providing a control signal from a controller to drive a brake pressure generator of the braking circuit, responsive to a braking request detected at a brake pedal, in order to provide a braking pressure at a wheel cylinder of the braking circuit;
   detecting impending wheel lock-up with the controller and in response, beginning an anti-lock braking routine during which the controller is programmed to create an artificial haptic feedback pulse to the brake pedal by opening the isolation valve to cause a master cylinder piston to retract until a compensation port is opened, connecting a master cylinder chamber with a fluid reservoir; and
   repeating the artificial haptic feedback pulse throughout the anti-lock braking routine by repeatedly opening and closing the isolation valve to move the master cylinder piston back and forth across the compensation port,
   wherein the controller creates the artificial haptic feedback pulse with a frequency selected from a plurality of programmed frequencies to correlate with a condition of the ongoing anti-lock braking routine, and
   wherein the condition on which the artificial haptic feedback pulse frequency is selected is a number of vehicle wheels engaged in brake pressure reduction via the anti-lock braking routine.

7. The method of claim 6, wherein the brake pressure generator outputs brake pressure to the braking circuit through a control valve.

8. The method of claim 7, further comprising modulating an opening amount of the control valve with the controller to set a first pressure provided to the wheel cylinder.

9. The method of claim 6, wherein opening the simulator valve between the master cylinder and the pedal feel simulator connects the pedal feel simulator to a primary master cylinder chamber nearest the brake pedal and separate from a secondary master cylinder chamber.

10. The method of claim 9, wherein the master cylinder piston that retracts due to the opening of the isolation valve is a secondary master cylinder piston, and the secondary master cylinder chamber is connected with the fluid reservoir through the compensation port.

* * * * *